Figure 1:
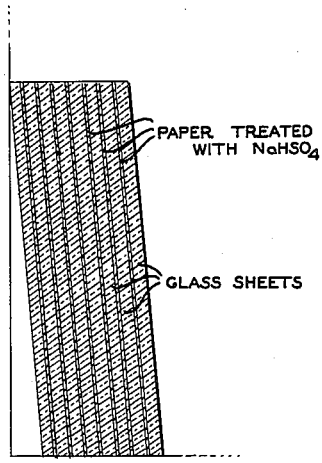

Feb. 28, 1961  E. BRICHARD ET AL  2,973,089
PROCESS FOR THE PROTECTION OF GLASS AGAINST IRIDESCENCE
AND PACKAGE FOR CARRYING THIS PROCESS INTO EFFECT
Filed May 8, 1957

INVENTORS
EDGARD BRICHARD
EMILE PLUMAT
LUCIEN LEGER
BY
Corey, Hart & Steneple
ATTORNEYS

United States Patent Office 2,973,089
Patented Feb. 28, 1961

2,973,089

PROCESS FOR THE PROTECTION OF GLASS AGAINST IRIDESCENCE AND PACKAGE FOR CARRYING THIS PROCESS INTO EFFECT

Edgard Brichard, Jumet, Emile Plumat, Gilly, and Lucien Leger, Montigny-le-Tilleul, Belgium, assignors to Union des Verreries Mecaniques Belges, Societe Anonyme, Charleroi, Belgium, a Belgian company Filed May 8, 1957, Ser. No. 657,745

Claims priority, application Belgium May 11, 1956

10 Claims. (Cl. 206—62)

The present invention is concerned with a process for protecting glass against iridescence, which is produced during storage in the warehouse and during the transport thereof. The invention is also concerned with the use of sodium bisulphate for carrying this process into effect.

It is known that glass can become iridescent, for example when it is kept in stacks of contacting sheets. The phenomenon is caused by the condensation of the moisture in atmospheric air on the surface of the sheets. Once the water is deposited, even in very small quantities, it is imprisoned between the surfaces of the contacting sheets and reacts with the components of the surface layers of the glass.

The reactions cause the formation of a siliceous film if irregular thickness at the surface of the glass sheets, this film having a refractive index different from that of the glass, this giving a very characteristic iridescent appearance to the glass in reflected light, which iridescene can range from greyish spots which can be scarcely seen to very marked colouring effects which in all cases make the glass sheets unsuitable for glazing purposes and for the other applications of sheet glass. This phenomenon can even be produced on other glass objects placed one against the other and even in fact on isolated objects. In the latter case, however, the phenomenon takes place less quickly.

Various solutions have already been proposed for overcoming this surface change in the glass. It is the current practice, for example, to separate the glass sheets by sheets of paper so that the chemical action of the water is retarded. This precaution does not however do more than retard the change, without being able to avoid it when the atmospheric conditions are relatively unfavourable.

This disadvantage is overcome by the process according to the invention.

It consists essentially in arranging that the glass is kept in contact with sodium bisulphate. The presence of this agent inhibits or sufficiently retards the development of surface reactions which cause the phenomenon of iridescence, so that in practice it is sufficient to remove this phenomenon under the usual conditions of storage and transport.

According to the invention, the sodium bisulphate is applied to one or both surfaces of the glass by any suitable means, for example by rubbing, coating or atomisation, depending on whether the sodium bisulphate is used alone or in admixture with an inert material in solid form, more particularly in the form of a powder, or in the form of a liquid, a solution or a suspension or is even incorporated by absorption or adsorption into or onto an inert material acting as a support, it being possible for the latter to be in the form of a powder or of a sheet which is placed against the glass surfaces.

Figure 2:
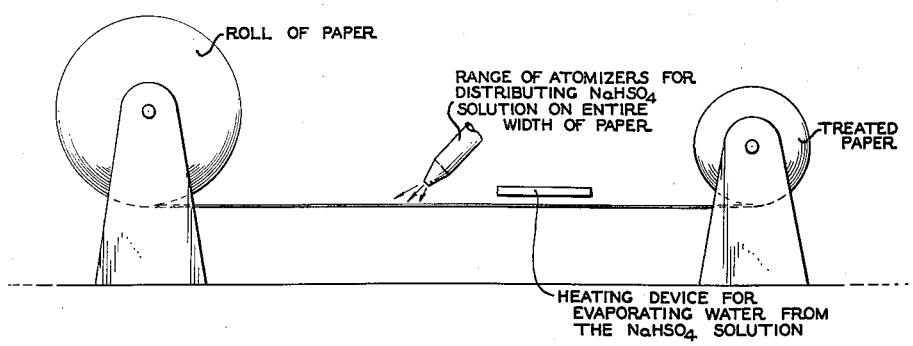

In the drawings:

Fig. 1 is a vertical section through a plurality of glass sheets interleaved with treated paper in accordance with this invention; and Fig. 2 is a diagrammatic sectional sketch showing a method of treating the paper of Fig. 1.

When the sodium bisulphate is in the form of a liquid, solution or suspension, the liquid containing the sodium bisulphate is advantageously evaporated before the glass is stored.

It has been found that practically all appearance of iridescence is avoided by sprinkling the glass surface with a finely powdered mixture of sodium bisulphate and an inert material forming a support. The sodium bisulphate is retained to a certain degree by the material serving as a support, so that the agent can be provided in a greater quantity than if it is deposited directly on the glass. The sodium bisulphate can thus be liberated according to requirements, depending on the storage conditions, and a protection of longer duration is obtained, as well as a better use of the agent.

According to one particular form of the invention, the deposition of the sodium bisulphate, either alone or incorporated into a powdered support, can with advantage be carried out by an electrostatic process. To this end, the substance to be applied to the glass surface, which substance is in finely powdered form and is suitably disposed before the sheets of glass, is subjected to the action of an electrostatic charge which precipitates it on the glass sheets disposed at a distance which is adjusted according to the field intensity, the degree of fineness of the substance and the nature of the latter. The advantage of this working method resides in a uniform distribution of the powder on the glass and in the fact that it adheres perfectly to the surface while the glass sheets are being manipulated. Depending on the speed at which the glass sheets are moved in front of the substance to be applied, a protective layer of greater or lesser thickness will be obtained and consequently a protective action of greater or shorter duration.

According to another embodiment, it is advantageous to incorporate the sodium bisulphate into a sheet support preferably comprising cellulosic material and to place these impregnated sheets (see Fig. 1) against the surface of the glass to be protected. This method of procedure is a particularly simple form and it offers the advantage of a uniform distribution of the sodium bisulphate by an operation of impregnating the sheet consisting of cellulose material, such as wrapping paper or the like, during the manufacture thereof or at any time after manufacture (see Fig. 2). Moreover, the impregnating operation permits accurate measuring of the quantity of sodium bisulphate to be incorporated into the cellulose material and this quantity is kept constant. The sheet of cellulose material also fixes the sodium bisulphate and, when placed against the glass surface, it does in itself contribute to the retarding of the phenomenon of iridescence. In the same way as for the powder mixture of sodium bisulphate and inert material, there is also produced a retention effect which permits the agent to be liberated according to requirements. In practice, the sheets comprising a cellulose material are preferably used in the form of wrapping paper impregnated with sodium bisulphate so that this paper shows an acidity corresponding to a pH value between 4 and 7.

Depending on the composition of the glass and possibly on the nature of the inert material which is chosen, it will be of interest to vary the quantity of sodium bisulphate as a function of the period of storage or transport, and of the atmospheric conditions, more especially the temperature and the degree of hygroscopicity of the air.

Experience has shown that good results are generally obtained, for example, by using 0.05 to 2 g./m.² of sodium bisulphate and preferably 0.3 to 0.5.

The upper limits are imposed because of the aggressive nature of the sodium bisulphate with a view to avoiding the destruction of certain of the inert materials serving as support, and the lower limits are determined by the efficacy of the agent, quantities below these limits only providing protection against the phenomenon of iridescence during a very short period.

The inert materials acting as support are neutral or very slightly acid mineral or vegetable products, such as for example sawdust, talcum, kaolin, hydrated calcium sulphate, and cellulose products.

The inventors have discovered that sodium bisulphate is particularly suitable as sodium bisulphate, owing to the fact that it has a degree of acidity sufficient to neutralise the alkali liberated by the glass, without however causing the neutralization of the surface alkalinity to be accelerated, producing more or less indelible stains on the glass surface or leaving thereon an insoluble residue affecting the transparency or even attacking the glass. Furthermore, it does not influence the properties of the inert supports containing cellulose and it has no harmful action on the personnel, so that the paper which is impregnated therewith maintains its mechanical resistance and can be manipulated by the personnel without taking special precautions.

The process which has been described is suitable for the protection of any glass surfaces, but it is obvious that the use thereof is of particular interest when it is a question of protecting stacked glass sheets, the surfaces of which are most exposed to iridescence during storage and transport.

The invention is of course not limited to the embodiments which have been described by way of example, and it would not be a departure from its scope to incorporate modifications as regards the composition of the inert materials or even from the point of view of their application.

We claim:

1. A glass sheet protected from iridescence of the surfaces thereof comprising said glass sheet, and wrapping paper in contact with said surfaces, said paper being impregnated with 0.05 to 2 grams per square meter of sodium bisulphate.

2. Glass sheets protected from iridescence of the surfaces thereof comprising a plurality of said glass sheets stacked together, and wrapping paper interleaved between successive glass sheets, said paper being impregnated with 0.3 to 0.5 grams per square meter of sodium bisulphate.

3. A process for protecting glass surfaces against iridescence comprising treating said surfaces with sodium bisulphate.

4. A process as claimed in claim 3 wherein said sodium bisulphate is applied to said surfaces in solid form.

5. A process as claimed in claim 3 wherein said sodium bisulphate is applied to said surfaces in the form of a finely divided neutral or slightly acid material impregnated with said sodium bisulphate.

6. A process as claimed in claim 3 wherein said sodium bisulphate is applied to said surfaces in the form of a sheet of cellulosic material impregnated with said sodium bisulphate.

7. A process as claimed is claim 3 wherein a sheet of paper impregnated with said sodium bisulphate is applied to said surfaces.

8. A process as claimed in claim 3 wherein said sodium bisulphate is applied by electrostatic precipitation to said surfaces.

9. A process as claimed in claim 3 wherein said surfaces are treated with 0.05 to 2 grams per square meter of said sodium bisulphate.

10. A process as claimed in claim 3 wherein said surfaces are treated with 0.3 to 0.5 gram per square meter of said sodium bisulphate.

References Cited in the file of this patent

UNITED STATES PATENTS

| | | |
|---|---|---|
| 2,495,043 | Willey et al. | Jan. 17, 1950 |
| 2,528,391 | Seddon | Oct. 31, 1950 |

FOREIGN PATENTS

| | | |
|---|---|---|
| 394,635 | Great Britain | June 29, 1933 |
| 1,937 | Great Britain | 1864 |